3,579,533
PREPARATION OF PORPHIN, SUBSTITUTED PORPHIN AND METAL CHELATES THEREOF
Richard G. Yalman, Yellow Springs, Ohio, assignor to Antioch College, Yellow Springs, Ohio
No Drawing. Filed Mar. 18, 1968, Ser. No. 714,064
Int. Cl. C07d 27/76
U.S. Cl. 260—314                                10 Claims

ABSTRACT OF THE DISCLOSURE

Preparation of porphin, meso monomethyl-, meso dimethyl-, meso trimethyl-, and meso tetramethylporphin, and the metal chelates thereof in relatively large quantities with yields in the range of 1% to 20% is accomplished by cyclic condensation of a pyrrole having a primary or secondary carbinol in the 2 position thereof to form a metal chelate followed by demetallation to form porphin or the meso substituted porphin. The reaction mixture includes the hydroxypyrrole, a metal acetate, an organic acid and a polar solvent, and by (1) controlling the pH of the buffer formed by the metal acetate and the acid to between 3.2 and 5.5 based on a water system, (2) controlling the temperature of the reaction mixture in the range of 120° C. to 150° C., and (3) reducing the self-polymerization of the hydroxy-pyrrole by dropwise addition of a precooled mixture thereof to a preheated solvent system, much improved yields of the metal chelates are obtained. Also, the yields of porphin and meso substituted porphins were increased by an improved demetallation procedure permitting 75% to 85% yields from the corresponding metal chelates. Various metal acetates, solvents, temperature ranges, ratios of reactants and reaction conditions and techniques are described.

BACKGROUND OF THE INVENTION

This invention relates to an improved process for the production of porphin, meso substituted porphin and metal chelates thereof.

Several processes are known for the preparation of compounds having the general formula

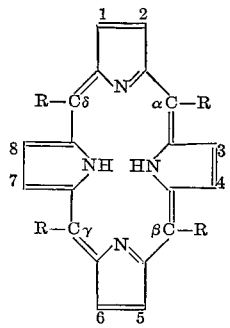

in which R is a hydrogen or methyl group. Where R is hydrogen, the product is porphin and where R is a methyl group the product is alpha, beta, gamma, delta, meso tetramethylporphin, sometimes called meso porphin. Fischer et al. (Liebig's Ann., 521, 157, 1936) synthesized porphin by boiling pyrrole alpha-aldehyde with formic acid. Rothemund (J. Amer. Chem. Soc., 58, 625, 1936) describes a synthesis of porphin by heating methanolic solutions of formaldehyde and pyrrole with pyridine in a sealed tube for thirty hours. Krol (J. Org. Chem. 24, 2065, 1959) reported isolation of porphin from the reaction product 2-hydroxymethyl-pyrrole, potassium persulfate and glacial acetic acid containing magnesium acetate.

The yields of all of the earlier work was relatively low, below 0.1% in the case of Fischer et al. and Rothemund. Although the yields obtained by Krol were somewhat higher, e.g., a high of 5%, these yields were obtained with small quantities of reactants, and attempts to scale up to larger quantities resulted in a much reduced yield. Thus, while the exact reason for the reduced yield in the attempted scale up is not known, it is believed attributable to the acid induced self-polymerization of 2-hydroxymethylpyrrole to form a black amorphous residue. At the lower levels of reactants which produce the 5% yield, there is apparently some inhibition of the detrimental self-polymerization of the pyrrole. However, a recent modification of the Krol process on a 30 mg. scale resulted in a 3% yield (E. Samuels, R. Shuttleworth and T. S. Stevens, J. Chem. Soc., (C) 145, 1968).

U.S. Patent No. 3,076,813 describes a procedure for production of aryl substituted porphins by heating pyrrole and aldehyde in the absence of a solvent.

In my earlier application Ser. No. 589,842 filed Oct. 27, 1966, and assigned to the U.S. Government, I described a procedure for the preparation of tetrapyrrroles or porphins, in which pyrrole and an aldehyde were dissolved in a solvent, and the reaction conducted under critical conditions with respect to the solvent. While this system offers good yields, it imposes practical limitations due to the size of the bomb, oven size and the fact that the reaction is conducted at or near critical conditions. Also, the isolation procedure is somewhat complicated because of the purification treatment by column chromatography.

SUMMARY OF THE INVENTION

In accordance with the present invention, a much improved process for the production of porphin, alkyl substituted porphins and metal chelates thereof involves the condensation of a pyrrole having a primary or a secondary carbinol functional group in the 2 position. The condensation is carried out in the presence of a polar solvent and a buffer system including an organic acid and a metal acetate, the buffer having a pH in a water system of between 3.2 and 5.5 with 3.7 being optimum for the method herein described. Preferably, the temperature of the reaction is below the boiling point of the polar solvent, and optimally in the range of between 120° to 150° C. Contrary to the prior art workers, it has been found advantageous first to form the metal chelate of porphin or the substituted porphin followed by demetallation. In this way, purification of porphin or the substituted porphin is simplified and yields are increased substantially above those previously obtainable while permitting scale up to larger quantities of reactants. For example, it is possible, in accordance with the present invention to obtain quantities of between 1000 to 1250 milligrams of porphin or the substituted porphin, while the prior art workers obtained relatively small quantities of porphin. In the case of Rothemund, 1 milligram of porphin was obtained per gram of pyrrole starting material. Krol, on the other hand reports a maximum 5.33% yields in a system including 785 micrograms with the total amount of porphin being 33.86 micrograms. Samuels, Shuttleworth and Stevens obtained a 3% yield on a 30 milligram scale. By the present invention, yields in excess of 20% are obtainable, and on a much larger scale.

Further, it has been found that increased yields and the ability to maintain the increased yields on large scale is a function of the temperature of the solvent system, which is stabilized during the reaction between 120° and 150° C. Also, increased yields were observed when the reagent mixture including the pyrrole starting material, polar solvent and acid were prepared in a sequence by which the acid is precooled and added to a precooled mixture of the pyrrole and the solvent, thus tending to reduce substantially the self-polymerization of the pyrrole. The purification of the metal chelate was simplified, as well as the demetallation procedure in which anhydrous hydrogen chloride is passed through a solution of the chelate in chloroform, the system being at a temperature in the range of —5 to —10° C. to provide a yield of between 75% to 85% in the conversion of the metal chelate to the corresponding product.

Another advantage of the present invention is the substantial absence of any detectable chlorin, that is, dihydrogen porphin.

Accordingly, it is a primary object of the present invention to provide an improved procedure for the preparation of porphin, alkyl substituted porphins and the metal chelates thereof.

Another object of the present invention is the provision of an improved process for the production of porphin, meso monomethyl-, meso dimethyl-, meso trimethyl-, and meso tetramethylporphin on a relatively large scale with yields in the range of 1% to 20%.

Another object of the present invention is an improved method for the preparation of porphin and meso monomethyl-, meso dimethyl-, meso trimethyl-, and meso tetramethylporphin by a procedure which includes the condensation of a pyrrole having a primary or a secondary carbinol in the 2 position to form a metal chelate followed by demetallation of the chelate to form the corresponding porphin.

Other objects and advantages of the present invention will be apparent from the following description and the appended claims.

DESCRIPTION OF THE INVENTION

According to the present invention, a pyrrole having a carbinol in the 2 position is condensed to form a tetrapyrrole ring. The pyrrole starting material is of the general formula

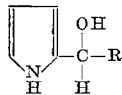

wherein R may be —H or —CH$_3$. The condensation is carried out under conditions which produce a metal chelate of the tetrapyrrole, followed by demetallation to form the tetrapyrrole or substituted product. Typical of the pyrrole carbinols which may be used are 2-hydroxymethyl pyrrole and methyl-2-pyrrole carbinol, the former, a primary alcohol producing metal porphin and the latter, a secondary alcohol producing the metal alpha, beta, gamma, delta, tetramethylporphin. Appropriate mixtures of these two pyrrole carbinols will yield meso monomethyl-, meso dimethyl-, and meso trimethylporphin. One of the considerations in accordance with the present invention is the elimination of self-polymerized products of the primary or secondary pyrrole carbinol in the reaction mixture. The presence of these products is easily detected by the yellow to brownish color of the pyrrole solution due to the presence of the polymers. The substituted pyrroles which are free of polymer products are water clear in color.

The starting pyrrole product may be obtained by reducing the corresponding aldehyde with potassium or sodium borohydride in water, extracting the pyrrole carbinol in ether, followed by vacuum distilling to remove the ether. It is preferred that the pyrrole carbinol be stored cold and free of acids since heat and acid tend to favor self-polymerization of these materials.

The condensation reaction is carried out in the presence of a polar solvent such as ortho-dichlorobenzene, dioxane, dimethyl formamide, dimethyl sulfoxide and n-butyl ether, although other polar solvents such as chloroform, carbon tetrachloride, ethyl acetate, acetonitrile and water may be used but produce lower yields.

The reaction mixture also includes a metal acetate and an organic acid present in amounts such that a buffer is formed having a pH of between 3.2 and 5.5 in aqueous media, with 3.7 being optimum. The acetate may be any one of the following, with the oxidation states in parenthesis as indicated: Chromium (III), iron (II), zinc (II), iron (III), nickel (II), cobalt (II), vanadium (II), manganese (II), copper (II) and palladium (II). The organic acids which may be used are acetic, propionic and formic.

Generally, the procedure for forming the metal chelates of the porphins and demetallation thereof in accordance with this invention involves forming a solvent system and a reagent mixture which are intermixed to provide a reaction mixture with the cyclic condensation taking place at atmospheric pressure. The solvent system includes a portion of the polar solvent and the metal acetate, this system being preheated to a temperature in the range of 120° C. to 150° C. The reagent system includes the pyrrole starting material, the remainder of the polar solvent, ether and the organic acid. It is important that the pyrrole starting material be free of pyrrole polymer products, and thus freshly prepared water clear material, or pyrrole material free of polymer products is used.

To ice cold ether, the appropriate amount of precooled pyrrole starting material is added. Then ice cold solvent is added while this mixture is maintained cold. Finally, the acid is added to the cold mixture of solvent and pyrrole starting material to form a reagent system which is kept ice cold until it is added to the preheated solvent system. By compounding the reagent system as described, the tendency to form pyrrole polymer products is substantially eliminated. If the reagent mixture starts to turn yellow, this indicates that some polymerization has taken place, and it can be expected that the yield of product will be low. Polymerization of the pyrrole starting material is substantially eliminated in accordance with the present invention by precooling all the components of the reagent system and by adding the acid last.

After preparation of the precooled reagent system, it is added dropwise to the preheated solvent system, the addition extending over about a ten minute period while maintaining the temperature stabilized within the range indicated. During reaction, the ether is evaporated. In the case of dimethylformamide solvent, the preferred solvent in accordance with this invention, the temperature is stabilized at 145° C.±1°. After the addition of the reagent system, the reaction mixture is maintained at the reaction temperature for five minutes or more.

After the reaction is complete, the mixture is quenched by addition to a mixture of chloroform and concentrated HCl. Separation of impurities was easily effected since the chelate is soluble in chloroform and the impurities dissolved in the acid. The quench mixture is washed several times with concentrated HCl, and then water to remove the acid. The washed chloroform solution containing the metal chelate is then dried over Na$_2$SO$_4$. The metal chelate is recovered by evaporating the chloroform and recrystallized from a methanol-chloroform mixture.

Demetallation of the chelate is carried out by dissolving the chelate in chloroform, cooling the mixture to —5° to —10° C. and passing anhydrous gaseous HCl through the mixture. Yields of 75%–85% of porphin and meso monomethyl-, meso dimethyl-, meso trimethyl-, and meso tetramethylporphin from the corresponding chelates have been obtained.

The reaction time for the condensation in accordance with the present invention is rather short as shown by the following data:

TABLE I

[Reaction conditions: 40 mg. 2-hydroxymethylpyrrole in 1 ml. ether 20 ml. dimethylformamide, 140° C.]

| Reaction time, minutes: | Copper acetate, gram | Yield, percent |
|---|---|---|
| 5 | 1.0 | 1.9 |
| 10 | 1.0 | 2.4 |
| 25 | 1.0 | 2.3 |
| 45 | 1.0 | 2.3 |
| 180 | 1.0 | 2.1 |

In accordance with the present invention, better results are obtained with dimethylformamide, as indicated by the following data:

TABLE II

[Reaction conditions: 40 mg. 2-hydroxymethylpyrrole in 1 ml. ether, 1 gram copper acetate, 20 ml. solvent, 10 minutes at indicated temperature]

| Solvent | Reaction temperature, °C. | Yield, percent |
|---|---|---|
| Chloroform | 61.3 | .1 |
| Carbon tetrachloride | 76.8 | .15 |
| Ethylacetate | 70 | .12 |
| Acetonitrile | 80 | .09 |
| Dimethylformamide | 70 | .62 |
| Dioxane | 100 | 1.3 |
| Water | 100 | .03 |
| Dimethylformamide | 100 | 2.1 |
| Pyridine | 115 | (1) |
| Dimethylsulfoxide | 140 | .9 |
| Ortho-dichlorobenzene | 140 | 1.2 |
| n-Butyl ether | 140 | 2.3 |
| Dimethylformamide | 140 | 2.4 |

[1] None detected.

The optimum reaction temperature is between 120° C. and 150° C. and better yields were obtained in shorter reaction times as shown by the following data:

TABLE III

| Temperature [1] | Reaction time [2] or range, minutes | Percent yield | Milligrams |
|---|---|---|---|
| \multicolumn{4}{c}{A. Dimethylformamide [3]} | | | |
| 120 | 20-30 | 3.5 | 1.4 |
| 130 | 5-10 | 4.0 | 1.6 |
| 140 | 1-5 | 4.3 | 1.7 |
| 150 | 1 | 5.1 | 2.0 |
| \multicolumn{4}{c}{B. n-Butyl ether [1]} | | | |
| 120 | 1-5 | 3.3 | .66 |
| 130 | 2-4 | 4.6 | .92 |
| 140 | 2-3 | 5.9 | 1.18 |

[1] Ten milligrams of a cold solution of 2-hydroxymethylpyrrole in 1 ml. ether added dropwise to the heated solution of 1 gram copper acetate in 20 ml. n-butyl ether.
[2] Reaction time measured from end of addition of reagents.
[3] Twenty milligrams of a cold solution of 2-hydroxymethylpyrrole in 1 ml. ether added dropwise to the heated solution of 1 gram copper acetate in 20 ml. dimethylformamide.

Various ratios of materials may be used, as follows:

Polar solvent between 50 and 1500 ml.,
Metal acetate between 100 mg. and 100 gms.,
Organic acid between 6 ml. and 50 ml.,
Hydroxypyrrole between 10 mg. and 4 gms.

The following data shown yields as high as 20%:

TABLE IV

| Solvent system | | 2-HMP | | DMF, milliliter | Acid, milliliter | Yield | |
|---|---|---|---|---|---|---|---|
| DMF, milliliter | Cu(OAc)₂, grams | Milligrams | Milliliter | | | Milligrams | Percent |
| \multicolumn{8}{c}{A. Acetic acid} | | | | | | | |
| 50 | 2 | 200 | 5 | | | 9.8 | 5.9 |
| 50 | 2 | 200 | 5 | 5 | 1 | 20.3 | 10 |
| 50 | 2 | 200 | 5 | 5 | 2 | 18.6 | 9.4 |
| 50 | 2 | 200 | 5 | 5 | 5 | 12.1 | 6.1 |
| 50 | 2 | 200 | 5 | 5 | 10 | 4.1 | 2.1 |
| 100 | 4 | 400 | 10 | 10 | .5 | 30.9 | 7.7 |
| 100 | 4 | 400 | 10 | 10 | 1.0 | 29.9 | 7.5 |
| 100 | 4 | 400 | 10 | 10 | 1.5 | 36.6 | 9.2 |
| 100 | 4 | 400 | 10 | 10 | 2 | 27.1 | 6.8 |
| 150 | 1.5 | 400 | 10 | 10 | 7.5 | 37.5 | 9.2 |
| 200 | 2 | 400 | 10 | 10 | 2 | 33.9 | 8.5 |
| 300 | 3 | 800 | 20 | 10 | 6 | 41.7 | 5.3 |
| 300 | 3 | 800 | 20 | 20 | 15 | 61.5 | 7.7 |
| 300 | 6 | 800 | 20 | 20 | 15 | 58.7 | 7.2 |
| 500 | 6 | 2,000 | 50 | 50 | 37 | 75.5 | 3.8 |
| \multicolumn{8}{c}{B. Formic acid} | | | | | | | |
| 50 | 2 | 200 | 5 | 5 | 0.5 | 21.4 | 10.8 |
| 50 | 2 | 200 | 5 | 5 | 1.0 | 21 | 10.6 |
| 50 | 2 | 200 | 5 | 5 | 2 | 12 | 6.1 |
| 50 | 2 | 200 | 5 | 5 | 5 | .98 | .5 |
| 50 | 2 | 2,000 | 5 | 5 | 10 | .40 | .2 |

| Solvent system | | 2-HMP [a] | | DMF, milliliter | HOAc, milliliter | Yield | |
|---|---|---|---|---|---|---|---|
| DMF, milliliter | Cu(OAc)₂, grams | Milliliter | Grams | | | Milligrams | Percent |
| 250 | 12 | 12 | .48 | 12 | 6 | 97.8 | 20.3 |
| 200 | 10 | 20 | .80 | 20 | 10 | 9.8 | 1.2 |
| 200 | 10 | 20 | .80 | 20 | 10 | 70.6 | 8.8 |
| 200 | 10 | 20 | .80 | 20 | 10 | 57.8 | 7.2 |
| 200 | 10 | 20 | .80 | 20 | 10 | 158.3 | 19.7 |
| 200 | 10 | 20 | .80 | 20 | 10 | 111.6 | 14.0 |
| 200 | 10 | 20 | .80 | 20 | 10 | 66.0 | 8.2 |
| 200 | 10 | 20 | .80 | 20 | 10 | 127.1 | 15.9 |
| 200 | 10 | 20 | .80 | 20 | 10 | 103.8 | 13.0 |
| 200 | 10 | 20 | .80 | 20 | 10 | 107.5 | 13.4 |
| 200 | 10 | 20 | .80 | 20 | 10 | 70 | 8.8 |
| 300 | 15 | 20 | 1.20 | 30 | 15 | 204.3 | 16.9 |
| 300 | 10 | 36 | 1.44 | 36 | 18 | 171.1 | 11.9 |
| 200 | 10 | 40 | 1.60 | 40 | 20 | 110.12 | 6.9 |
| 400 | 20 | 40 | 1.60 | 40 | 20 | 229.5 | 14.3 |
| 400 | 20 | 40 | 1.60 | 40 | 20 | 202.5 | 12.7 |
| 500 | 25 | 40 | 1.60 | 40 | 20 | 141.5 | 8.8 |
| 400 | 20 | 40 | 1.60 | 40 | 20 | 138.1 | 8.6 |
| 400 | 20 | 40 | 1.60 | 40 | 20 | 224.5 | 14.0 |
| 400 | 20 | 40 | 1.60 | 40 | 20 | 149.8 | 9.4 |
| 1,000 | 100 | 60 | 2.4 | 100 | 50 | 207.2 | 8.6 |
| 1,000 | 50 | 100 | 4.0 | 100 | 50 | 487 | 12.1 |
| 1,000 | 50 | 100 | 4.0 | 100 | 50 | 480 | 12.0 |
| 1,000 | 50 | 100 | 4.0 | 100 | 50 | 791 | 19.7 |

[a] In ether.

The following data shows the yields of the various metal porphins produced by the present invention, wherein yield is reported in terms of observed optical density in chloroform in the Soret region.

TABLE V

[Reaction conditions: 40 mg. of 2-hydroxymethylpyrrole in 1 ml. ether, 0.75 ml. acetic acid, 0.35 grams metal acetate, 140°, 1 minute—Duplicate experiments]

| Metal | λMax., mμ | Optical density |
|---|---|---|
| None added | 393.5 | 0.885 (.15 percent). |
| Chromium (III) | 380 | .46 (.05 percent). |
| Iron (II) | ¹ 388 | .47 (.05 percent). |
| Zinc (II) | 397 | 1.37 (.17 percent). |
| Iron (III) | ¹ 388 | 1.41 (.17 percent). |
| Nickel (II) | 387 | 1.69 (.19 percent). |
| Cobalt (II) | ² 409 | 1.75 (.20 percent). |
| Vanadyl (IV) | ³ 393.5 | 2.15 (.35 percent). |
| Manganese (II) | ⁴ 360 | 3.88 (.43 percent). |
| Copper (II) | 393 | 35.8 (6 percent). |

¹ Maximum at 388—found as iron (III).
² Found as Co (III).
³ All porphin.
⁴ Found as Mn (III):

The process of the present invention is particularly useful in the production of porphin and meso-porphins by forming the chelate using a reagent system of dimethylformamide, the corresponding pyrrole starting material and acetic acid dissolved in ether as described above and a solvent system including dimethylformamide and the acetate. The optimum pH was 3.7 with an optimum reaction temperature of 145°±1° C. The reaction produced no chlorin, and it appears that the acetate acts both as a template and an oxidizing agent.

Dimethylformamide is preferred for practical reasons, i.e., it is easier to control the reaction temperature and the recovery of copper chelate of the meso substituted porphin is simpler. It was also found that quenching the reaction mixture as above described, or by pouring over crushed ice, followed by extraction of the chelate in chloroform easily affected removal of the impurities. Further washings with chloroform and hydrochloric acid were performed, as needed, until the washings were colorless.

In addition to demetallation as above described, the metal porphin could also be demetallated by dissolving the chelate in chloroform or benzene and treating with an acid solution containing 62.5% to 90% sulfuric acid, by volume. The rate of demetallation is rapid as opposed to the procedure previously described, but an unidentified by-product is formed and the yield decreases. Demetallation may also be carried out by use of lithium in ethylenediamine as described in J. Chem. Soc., 4098, 1964.

While the methods herein described preferred embodiments of the invention, it is to be understood that the invention is not limited to these precise methods, and that changes may be made therein without departing from the scope of the invention which is defined in the appended claims.

What is claimed is:

1. The method of synthesizing a metal chelate of a porphin and a meso-substituted porphin, comprising the steps of forming a reaction mixture in which the ingredients comprise a polar solvent selected from the group consisting of chloroform, carbon tetrachloride, ethylacetate, acetonitrile, dimethylformamide, dioxane, water, dimethylsulfoxide, ortho-dichlorobenzene, and n-butyl ether, a metal acetate selected from the group consisting of chromium (III), iron (II), zinc (II), iron (III), nickel (II), cobalt (II), vanadium (IV), manganese (II) copper (II), and palladium (II) acetates, an organic acid selected from the group consisting of acetic, proprionic and formic acid, and a pyrrole starting material of the following structure

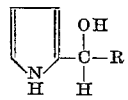

wherein R is selected from the group consisting of —H and —CH₃, said reaction mixture being formed by intermixing (1) a solvent mixture preheated in the range of 120° C. to 150° C. and containing a portion of the polar solvent and said metal acetate, and (2) a precooled ice cold reagent system including said pyrrole starting material, the remainder of said polar solvent, ether and said organic acid, said organic acid and metal acetate forming a buffer having a pH in a water system of between 3.2 and 5.5; and heating said reagent mixture below the boiling point of said solvent to effect condensation of said pyrrole starting material to form a cyclic chelate of the formula

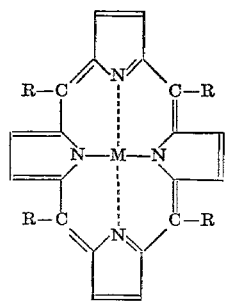

wherein M is the metal of said acetate and R is selected from the group consisting of —H and —CH₃.

2. The method as set forth in claim 1 in which said cyclic chelate is demetallated by any one of the following methods (a) dissolving the chelate in a solvent and demetallating by passing anhydrous HCl therethrough at a temperature in the range of —5° C. to —10° C.;
(b) dissolving the chelate in a solvent and demetallating by treatment with an acid solution containing between 62.5% and 90% sulfuric acid by volume;

to produce a compound selected from the group consisting of porphin and alpha, beta, gamma, delta, tetramethylporphin, as well as meso monomethyl-, meso dimethyl-, and meso trimethylporphin.

3. The method as set forth in claim 1 in which said reaction mixture is heated at atmospheric pressure to a temperature in the range of 120° C. to 150° C. for a period of time of between one minute and 180 minutes.

4. The method as set forth in claim 1 in which said metal acetate is copper acetate, said acid is acetic acid present in an amount sufficient to provide a buffer system having a pH in water of about 3.7, said solvent being dimethylformamide, said precooled reagent system being added uniformly to said preheated solvent system while maintaining the mixture at a temperature of 145°±1° C., maintaining said reaction mixture at said temperature for ten minutes after addition of said reagent system, and quenching said reaction mixture.

5. The method as set forth in claim 1 wherein the ratios of components of said reaction mixture are as follows:

Polar solvent between 50 and 1500 ml.,
Metal acetate between 100 mg. and 100 gms.,
Organic acid between 0.5 ml. and 50 ml.,
Pyrrole starting material between 10 mg. and 4 gms.,
Ether between 0.25 ml. and 100 ml., and wherein the yield of said cyclic chelate is between 1% and 20%.

6. The method as set forth in claim 1 in which said mixture is quenched after formation of said cyclic chelate.

7. The method as set forth in claim 6 wherein said cyclic chelate is dissolved in a solvent and demetallated by passing anhydrous HCl therethrough at a temperature in the range of —5° to —10° C.

8. The method as set forth in claim 1 wherein said pyrrole starting material is 2-hydroxymethyl pyrrole.

9. The method as set forth in claim 5 wherein said cyclic chelate is demetallated by dissolving said cyclic chelate in a solvent, cooling the solution of said cyclic chelate to between —5° C. and —10° C. and passing anhydrous hydrogen chloride through the solution.

10. The method as set forth in claim 1 wherein said reagent mixture is intermixed with said solvent mixture by the uniform addition of the precooled reagent system to said preheated solvent mixture.

References Cited

UNITED STATES PATENTS 3,076,813   2/1963   Sharp _____ 260—314

HENRY R. JILES, Primary Examiner

H. I. MOATZ, Assistant Examiner